United States Patent [19]

Hall et al.

[11] Patent Number: 5,402,132
[45] Date of Patent: Mar. 28, 1995

[54] MONOPOLE/CROSSED SLOT SINGLE ANTENNA DIRECTION FINDING SYSTEM

[75] Inventors: Edward A. Hall; Gilbert J. Schmitt, both of St. Louis, Mo.

[73] Assignee: McDonnell Douglas Corporation, St. Louis, Mo.

[21] Appl. No.: 289,493

[22] Filed: Aug. 12, 1994

Related U.S. Application Data

[63] Continuation of Ser. No. 890,266, May 29, 1992, abandoned.

[51] Int. Cl.⁶ .......................... G01S 5/04; G01S 5/02; H01Q 21/00
[52] U.S. Cl. .................................. 342/432; 342/429; 343/725; 343/729
[58] Field of Search ................ 342/428, 429, 432–435, 342/437; 343/725, 729, 769, 770

[56] References Cited

U.S. PATENT DOCUMENTS

| | | | |
|---|---|---|---|
| 2,286,839 | 6/1942 | Schelkunoff | 250/11 |
| 3,725,937 | 4/1973 | Schreiber | 342/433 |
| 4,062,015 | 12/1977 | Litva et al. | 342/434 |
| 4,443,802 | 4/1984 | Mayes | 343/729 |
| 4,587,524 | 5/1986 | Hall | 343/729 |
| 4,684,953 | 8/1987 | Hall | 343/725 |

OTHER PUBLICATIONS

Itoh et al, "A Novel Slots—and Monopole Antenna With A Steerable Cardioid Pattern", IEEE Trans. on Aerospace & Electronic System, vol. AES-8 No. 2 (Mar. 1972).

Primary Examiner—Gregory C. Issing
Attorney, Agent, or Firm—Bell, Seltzer, Park & Gibson

[57] ABSTRACT

A direction finding system utilizing a single monopole/-crossed slot antenna in combination with associated electronic circuitry. Each of the four ports of the antenna are connected to amplitude varying elements whose outputs are combined by a power combiner. A microcontroller stores the signal. The microcontroller also generates the signals which control the amplitude variation supplied by each of the amplitude varying elements. Two configurations of the amplitude varying elements are provided by predetermined settings within the microcontroller. The two settings are selected to configure the antenna on two distinct reception patterns, each with a predetermined angular offset from a reference direction. In operation the antenna will be configured for a first reception pattern. The signals received will be detected, quantified, and stored by the microcontroller which subsequently reconfigures the antenna for a second reception pattern. A second signal is received by the antenna in the second configuration and again is detected, quantified, and stored by the microcontroller. The microcontroller determines the difference between the two signals and, based upon a predetermined calibration curve relating differences in the stored signals to the angle of arrival of the signals from the reference direction, determines the angle from which the signal arrived.

20 Claims, 3 Drawing Sheets

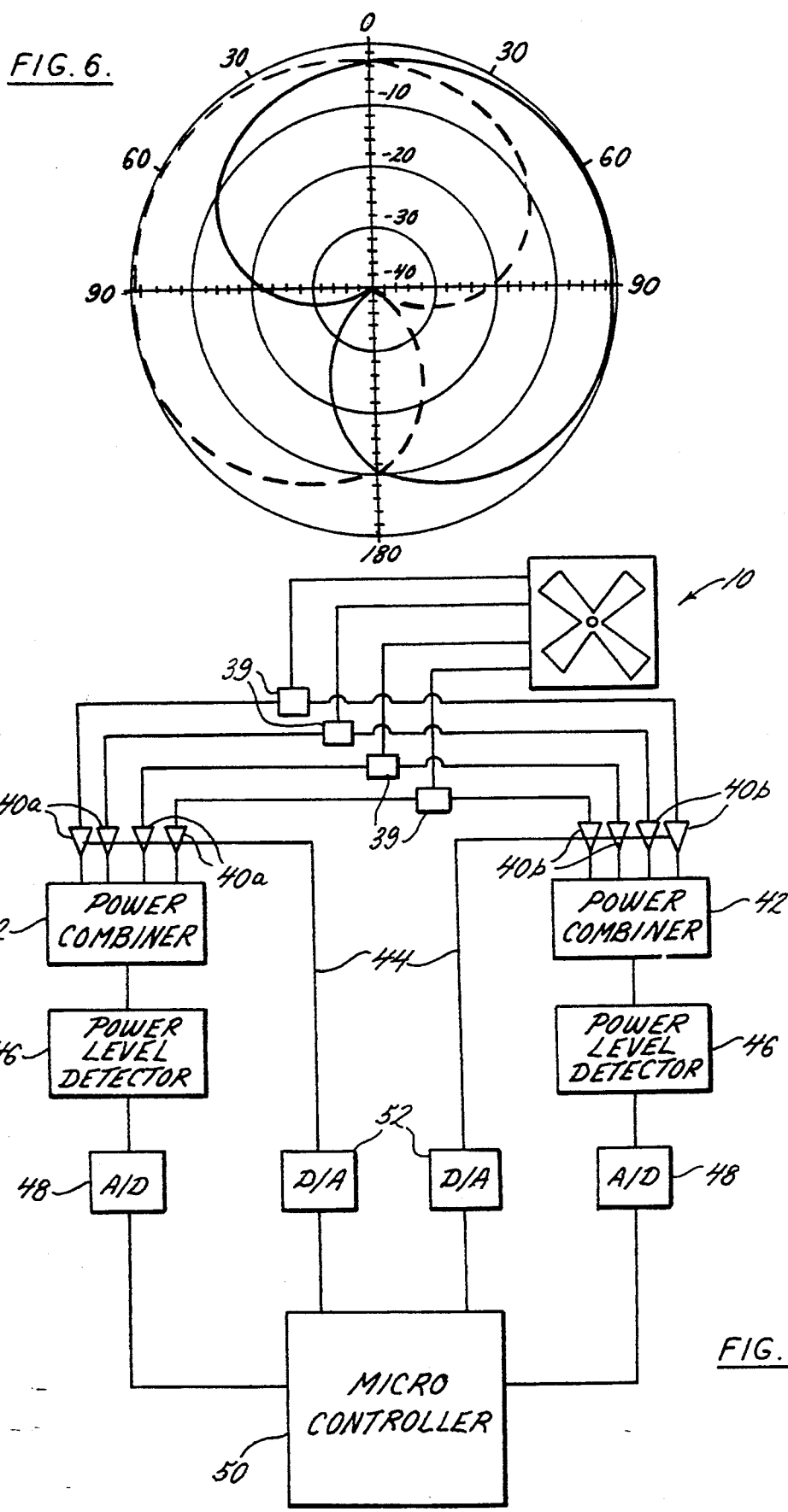

MONOPOLE/CROSSED SLOT SINGLE ANTENNA DIRECTION FINDING SYSTEM

This application is a continuation of application Ser. No. 07/890,266, filed May 29, 1992, now abandoned.

BACKGROUND OF THE INVENTION

This invention relates generally to direction finding systems utilizing a single antenna and more particularly to direction finding systems utilizing a single monopole/crossed slot antenna.

Antenna systems are currently utilized in many direction finding systems in which an antenna receives a propagating signal and determines the approximate angle of arrival of the signal. Many current direction finding systems utilize an array of antenna elements comprising at least two individual antennas. For example, in a typical phase based direction finding system, a pair of antennas would be positioned a predetermined distance from one another. The antennas receive externally propagating signals and utilize the received signals to determine the origin of the signal based upon the difference in phase received by each of the two antenna elements. While such phase based systems do provide direction finding capabilities, such systems typically require at least two antennas which are separated from one another. The antennas thus occupy more surface area upon the platform on which the antennas are mounted than would a single antenna. Additionally, the platform may not be shaped to allow the pair of antennas to be oriented as desired in order to obtain the most accurate and efficient reception.

An alternative direction finding system is one based upon the amplitude of the received signals. In such an amplitude-based direction finding system, two antennas are typically utilized such as those disclosed by Mayes in U.S. Pat. No. 4,443,802 entitled "Stripline Fed Hybrid Slot Antenna." Antennas such as those disclosed by Mayes produce cardioid-shaped radiation patterns which, as illustrated in FIG. 5 of the Mayes patent, may be directed along one of four directions based upon the combination of inputs to the striplines of the antenna. By utilizing a pair of such antennas with each antenna having their cardioid shaped radiation patterns directed in a direction which is a known angular distance from a fixed reference direction, signals may be received by the two antennas which may be analyzed to determine the angle of arrival of the signals. The difference of the amplitudes of the signals received by the two antennas is determined and, based upon a predetermined calibration curve of angular displacement from the fixed reference direction for various amplitude differences, the angular displacement of the signal's emitter from the reference direction may be determined. Such a direction finding system utilizing an antenna as is hereinbefore described, however, suffers from the limitation of requiring at least two antennas to properly determine the direction of the signal. Additionally, antennas such as those disclosed by Mayes may only be directed in four finite directions as opposed to being steerable over the antenna's circumference of 360°. This limitation restricts the number of positions to which the radiation patterns can be directed.

Therefore, it would be desirable to have a direction finding system based upon a single monopole/crossed slot antenna such that the number of antennas required is reduced and the platform space required to mount the antenna is decreased. Additionally, it would be desirable to have a direction finding system utilizing a monopole/crossed slot antenna which is steerable through the antenna's circumference of 360° and configurable to any desired radiation direction.

DETAILED DESCRIPTION OF THE DRAWINGS

FIG. 6 is a polar plot of two reception patterns rotated ±60° from a reference direction in which the antenna of the present invention is configured; and FIG. 7 is an electrical schematic representation of a second embodiment of the monopole/crossed slot antenna.

SUMMARY

Figure 1:
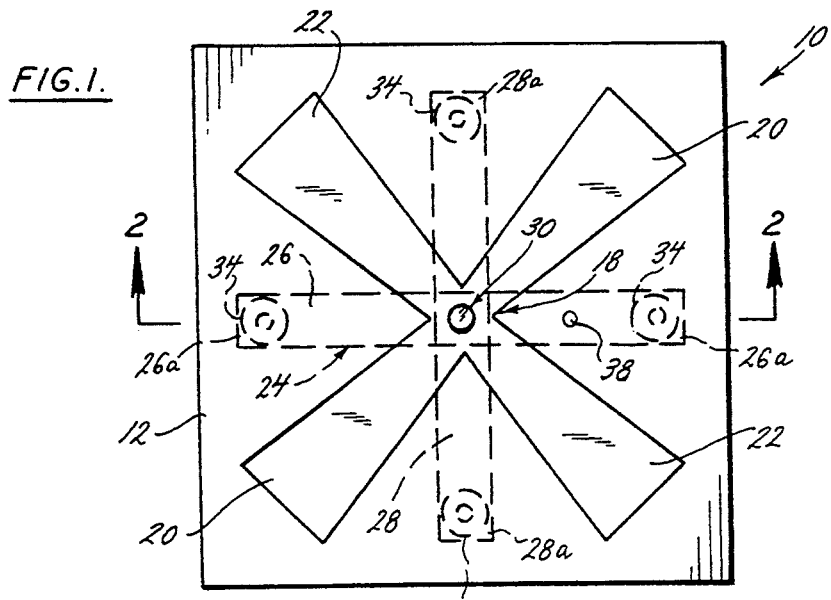
FIG. 1 is a plan view of a monopole/crossed slot antenna utilized by the direction finding system of the present invention.

There is provided by this invention a direction finding system utilizing a single monopole/crossed slot antenna in combination with associated electronic circuitry. The monopole/crossed slot antenna is comprised of a pair of parallel ground planes with an upper ground plane having two slot portions positioned orthogonal to one another. A pair of orthogonal striplines are positioned in the cavity defined between the ground planes-with each end of the striplines connected with ports to interface with the associated electronic circuitry. A monopole extends from the intersection of the striplines through the intersection of the slots in the upper ground plane.

In a first embodiment of the direction finding system, each of the four ports of the antenna are connected to amplitude varying elements, such as variable gain amplifiers or variable attenuators, whose outputs are combined by a power combiner. A power level detector transforms the raw radio frequency (RF) power level to a corresponding DC voltage. An analog-to-digital converter converts the DC voltage to a digital signal for receipt by a microcontroller. The microcontroller stores the signal.

The microcontroller also generates the signals which control the gain supplied to each of the amplitude varying elements. Two configurations of the amplitude varying elements are provided by predetermined settings within the microcontroller. The two settings are selected to configure the antenna on two distinct reception patterns, each with a predetermined angular offset from a reference direction.

In operation the antenna will be configured for a first reception pattern. The signals received will be quantified and stored by the microcontroller which subsequently reconfigures the antenna for a second reception pattern.

A second signal is received by the antenna in the second configuration and again quantified and stored by the microcontroller. The microcontroller subsequently determines the difference between the two signals stored therein and, based upon a predetermined calibration curve relating differences in the stored signals to the angle of arrival of the signals from the reference direction, determines the angle from which the signal arrived.

The calibration curves may be determined and encoded in the microcontroller for each pair of reception patterns in which the antenna will be configured. The orientation of the particular pair of reception patterns utilized may be selected to optimize the amplitude difference of the signals in the direction from which the signals are expected to originate.

The antenna may be continuously reconfigured in each of the two reception patterns with revised amplitude difference determined for the newly received signals.

A second confinement of the electronics associated with the monopole/crossed slot antenna is provided to allow for receipt of signals according to two distinct reception patterns simultaneously. In this second embodiment, power dividers are connected to the output ports of the antenna for splitting the received signals. Parallel paths are thereinafter provided with each path having amplitude varying means, a power combiner, a power level detector, and an analog-to-digital convertor prior to the presentation of the transformed signals to the microcontroller. The amplitude varying means are configured to adjust the amplitude of the received signals by different amounts corresponding to two distinct reception patterns. The microcontroller utilizes the simultaneously received signals in a like fashion to that previously described in order to determine the angle of arrival of the received signal.

Such a direction finding system may be utilized in conjunction with an existing phase-based direction finding system utilizing two antennas to allow wider spacing of the two antennas without decreasing the sensitivity of the determination of the angle of arrival of the signals.

In this combination of a phased-based dual antenna system and a single monopole/crossed slot antenna system, the pair of antennas may be broadly spaced and when operating as a phase-based system can determine the angle of arrival within ±0.5°. The broadly spaced phase-based system, however, cannot determine which of several potential angles is correct. Thereinafter, one of the two antennas is electrically reconfigured to operate as a single monopole/crossed slot antenna which determines which of the potential angles of arrival is true and which are "ghost" signals. Thus, the combination allows for increased flexibility in positioning a pair of antennas while providing improved accuracy over a single monopole/crossed slot antenna direction finding system.

DETAILED DESCRIPTION OF THE PREFERRED EMBODIMENTS

Figure 2:
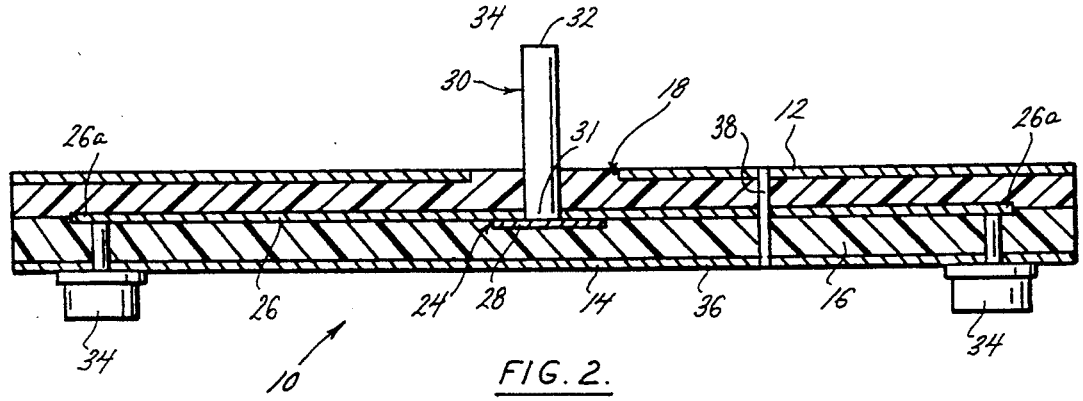
FIG. 2 is a view in section taken along line 2—2 of FIG. 1.

A monopole/crossed slot antenna 10 utilized to perform the direction finding function in a preferred embodiment of the present invention is shown in perspective in FIG. 1 and in more detail in FIG. 2. The antenna 10 includes generally parallel spaced ground planes 12 and 14 defining a cavity 16 therebetween. The upper ground plane 12 has a slot 18 having slot portions 20 and 22 as shown in FIG. 1. These slot portions 20 and 22 are orthogonal to the one another and intersecting or crossing at the centers. Each slot is configured in a bow tie-shape with a linear increasing slot width in a direction away from their intersection. The slot portions, however, may also be configured as a pair of rectangular slots with a constant and equal slot width as is well known to those skilled in the art without departing from the scope of this invention.

The two ground planes 12 and 14 are formed of a conductive material and are held in place by dielectric material filling all or an appropriate part of the cavity 16 between the ground planes. Located between the two ground planes is a stripline 24 of a conductive material. The stripline 24 includes stripline portions 26 and 28 positioned parallel to the ground planes 12 and 14 and each consisting of relatively long, narrow strips; one orthogonal to the other and intersecting or crossing at their centers. While the stripline 24 may be positioned an equal distance from both the upper and lower ground planes, the stripline 24 is preferably offset toward the upper ground plane 12. Additionally, stripline portions 26 and 28 are oriented 45° out of alignment with the longitudinal axis of the slot portions 20 and 22. A first end 31 of a monopole 30 is connected at the center of the stripline 24 such that the monopole 30 connects with both stripline portions 24 and 26 and extends therefrom through the slot 18 at the center of the intersection of the slot portions 24 and 26 orthogonal to the ground plane 12. The monopole 30 may be loaded to reduce its height either by means of a conductive disk or "top hat" positioned at its second end 32 or by means of an inductive coil which forms the lower portion of the monopole 30 and extends typically from the connection of the monopole 30 with the intersecting striplines 26 and 28 through the upper ground plane 12. Such loading of the monopole 30, however, is not necessary for the appropriate functioning of the antenna 10. Additionally, although not shown each of the slot portions 20 and 22 may be capacitively loaded across its width near the monopole 30, however, such capacitive loading is not required for proper antenna response.

The terminal ends 26a and 28a of the stripline portions 26 and 28 respectively are connected to suitable ports or connectors such as coaxial connectors 34 on the external surface 36 of the lower ground plane 14 of the antenna 10 as shown in section view in FIG. 2. Additionally, spaced conductive posts 38 extend through the layers and serve both to join the upper and lower ground planes 12 and 14 together and to define the perimeter of the cavity 16. These posts 38 are conductively joined to each of the two ground planes 12 and 14.

To more fully explain the functioning of the antenna 10, the monopole 30 radiates an omnidirectional pattern with constant phase in all ground plane directions. The crossed slot 18 radiates a figure eight pattern with a 180° phase reversal between lobes. With simultaneous excitement of both elements, the patterns sum in one direction and subtract in the other such that where the amplitudes match and phases are reversed, a null results. This condition is exactly met only in one direction which lies in a ground plane direction and forms a cardioid radiation pattern.

One or both slot portions 20 and 22 can be excited by the stripline feeds 24 by selecting various combinations of driving ports 34. Ports 34 not driven are terminated in a matched load, typically 50 ohms, to which the system is preferably designed. The radiation pattern of the antenna 10 may be controllably and predictably steered through the full 360° circumference of the antenna 10 by varying the gain supplied to the signals received at each of the ports 34 connected to the terminal ends 26a and 28a of the striplines 26 and 28. Complete quadrant symmetry is exhibited such that the steering algorithm herein disclosed and utilized provides a variable steering throughout an angular range of 90°; by driving one combination of the four ports 34 and full coverage of the 360° circumference may be obtained by driving different combinations of the four ports 34.

While the antenna 10 has heretofore been described in reference to its radiation of a cardioid-shaped pattern that is steerable over the full 360° circumference of the antenna 10, such an antenna 10 is utilized in the direction finding system of the present invention as a passive receiver. As is well known to those skilled in the art, the reception pattern or amount of attenuation provided signals received at differing angles is analogous to the radiation pattern of a transmitting antenna, cardioid-shaped in this instance. Additionally, in contrast to a transmitting antenna in which the ports are fed predetermined amounts of energy in order to properly direct the radiation pattern, varying amounts of gain or attenuation are supplied to the signals received at the ports 38 of the antenna 10 in a receiving configuration in order to properly direct the reception pattern.

Figure 3:
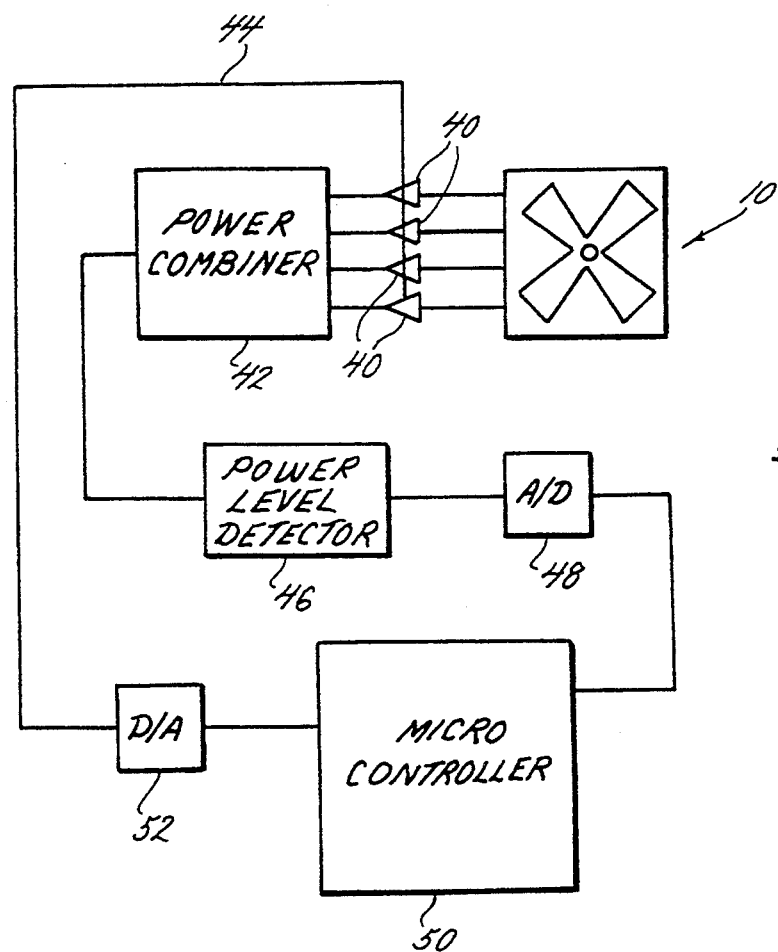
FIG. 3 is a schematic of the monopole/crossed slot antenna and the associated electronic components comprising the direction finding system of the present invention.
Figure 4:
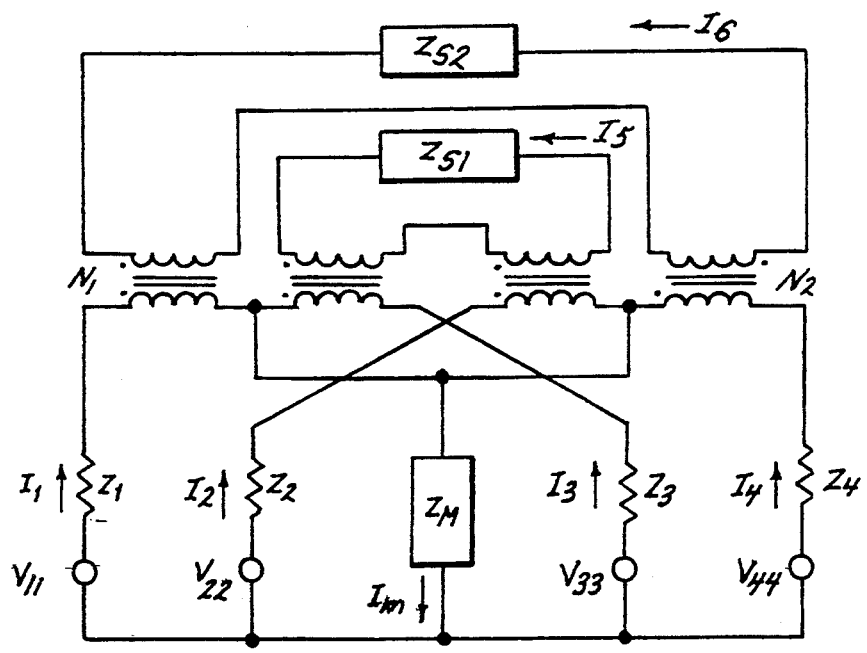
FIG. 4 is an electrical schematic representation of the monopole/crossed slot antenna.

The antenna 10 described heretofore is utilized in the direction finding system to which this invention is directed. More particularly, the monopole/crossed slot antenna 10 is configured with a first embodiment of the accompanying electronics as shown schematically in FIG. 3. Four amplitude varying elements 40 are attached to the antenna 10 with one connected to each of the four ports 34 of the antenna 10. The amplitude varying elements may be either variable gain amplifiers or variable attenuators which may control the gain or loss given a signal transmitted therethrough in response to an external control signal. The outputs of the four amplitude varying elements 40 are routed to a power combiner 42. The output of the power combiner 42 is the sum of the power levels of the radio frequency (RF) signals received by the antenna 10, transmitted through the four ports 34 and modified by the amplitude varying elements 40. The amplitude varying elements 40 are electronically controlled by means of individually accessible control lines 44 so that the amplitude variation of each individual element 40 may be set to a value within the range of 0% to 100%. The values of the amplitude variation attributable to each amplitude varying element 40 is determined according to the desired angular direction of the reception pattern of the antenna 10. Specifically, the values selected for the amplitude variation of the amplitude varying element 40 are determined in accordance with the following algorithm:

Equation (1) is determined by reference to FIG. 4 which is an electrical schematic representation of the monopole/crossed slot antenna comprising a portion of this invention. The reference subscripts 1, 2, 3, 4, $S_1$, $S_2$ and M designate port 1, port 2, port 3, port 4, slot 1, slot 2, and the monopole respectively. For example, $V_{11}$ is the voltage present at the first port, $I$ is the current present at the first port, and $Z_1$ is the impedance present at the first port. $Z_m$, $Z_{s1}$, and $Z_{s2}$ are the impedances imposed by the monopole, first slot, and second slot respectively. $I_5$ and $I_6$ are the currents flowing across the first and second slots respectively. $N_1$ and $N_2$ are the turns ratios of the pair of transformers representing the two radiative elements, the monopole and the crossed slots respectively. Additionally, in equation (1), "a" equals $0.25(N_1/N_2)^2$.

For a given antenna configuration, the impedances are known quantities. For example, an antenna having the following parameters and radiating in the range of 20 MHz–200 MHz has been constructed:

The spacing g between the upper and lower ground planer equals 1.218 inches;

The distance gs between the striplines and the upper ground plane equals 0.562 inches;

The width Wa of the stripline equals 0.48 inches;

The height h of the monopole from its connection at the intersection of the stripline equals 5.50 inches;

The width Ws of the bow tie shaped slots varies linearly from a width of 0.875 inches at the intersection of the slots to 2.125 inches at the portion of the slots furthest from the slots' intersection;

The coil length lc is 1 inch and forms a portion of the 5.5 inch height of the monopole;

The number of coil turns tc is 11 turns of 20 gauge wire wound on a 0.25 inch diameter round core formed of a non-conductive epoxy;

The length l of each slot portion equals 12 inches;

The spacing s of the conductive posts equals 1.0 inches such that the cavity dimensions are 11.5 inches wide by 11.5 inches long by 1.218 inches thick. The slot was capacitively loaded.

For an antenna constructed with these parameters, the corresponding impedances are $Z_m = 35\Omega$; $Z_{s1} + Z_{s2}$; and $(\frac{1}{4})(N_1/N_2)^2 Z_{s1} = (\frac{1}{4})(N_1/N_2)^2 Z_{s2} = 71\Omega$. Thereafter, the angle of rotation of the reception patterns are selected and the necessary current values, $I_1$, $I_2$, $I_3$, and $I_4$, to form these reception patterns are calculated from solving simultaneously the following for four equations:

$$I_5 = (\tfrac{1}{4})(N_1/N_2)(-I_1 - I_2 + I_3 + I_4) \tag{2}$$

$$I_6 = (\tfrac{1}{4})(N_1/N_2)(-I_1 + I_2 + I_3 - I_4) \tag{3}$$

$$I_m = I_1 + I_2 + I_3 + I_4 \tag{4}$$

$$Z_{s1} I_5^2 + Z_{s2} I_6^2 = I_m^2 Z_m. \tag{5}$$

Currents $I_5$ and $I_6$ are known quantities as the vector $$\begin{vmatrix} V_{11} \\ V_{22} \\ V_{33} \\ V_{44} \end{vmatrix} = \begin{vmatrix} Z_1 + Z_m + a(Z_{s1} + Z_{s2}) & Z_m + a(Z_{s1} - Z_{s2}) & Z_m - a(Z_{s1} - Z_{s2}) & Z_m + a(-Z_{s1} + Z_{s2}) \\ Z_m + a(Z_{s1} - Z_{s2}) & Z_2 + Z_m + a(Z_{s1} + Z_{s2}) & Z_m + a(Z_{s1} + Z_{s2}) & Z_m - a(Z_{s1} + Z_{s2}) \\ Z_m - a(Z_{s1} + Z_{s2}) & Z_m - a(Z_{s1} + Z_{s2}) & Z_m + Z_3 + a(Z_{s1} + Z_{s2}) & Z_m + a(Z_{s1} - Z_{s2}) \\ Z_m - a(Z_{s1} - Z_{s2}) & Z_m - a(Z_{s1} + Z_{s2}) & Z_m + a(Z_{s1} - Z_{s2}) & Z_4 + Z_m + a(Z_{s1} + Z_{s2}) \end{vmatrix} \begin{vmatrix} I_1 \\ I_2 \\ I_3 \\ I_4 \end{vmatrix} \tag{1}$$

such that the antenna's reception pattern may be selected at any angle within the 360° circumference of the antenna 10.

sum of these currents determine the rotation of the antenna's reception pattern. Thus, $I_5$ and $I_6$ are selected such that the angle of their vector sum is directed in the direction in which the reception pattern will point. Thus, to select a reception pattern directed +60° from boresight for the antenna previously described, the ratio of $I_5$ to $I_6$ will be 0.27.

In equation (5), the same impedance values are previously determined are applicable. Equation (5) is utilized since a perfect cardioid shape is produced when the power received by the monopole and the crossed slots are equal.

Additionally, to direct the reception pattern in any desired direction only three of the four ports will be driven while the remaining port connected to a matched load, typically 50 ohms. Thus, the current through this remaining port will be 0 amps which when substituted in equations (2)–(5) will enable the equations to be solved for the currents through the three ports which are being driven. The port which is terminated with a matched load is the port positioned the nearest angular distance from the desired location of the null of the cardioid-shaped reception pattern.

Once the current values are determined, equation (1) is utilized to solve for the voltage required at the four ports to configure the antenna in the desired reception pattern. For the exemplary antenna described above and configured to have a reception pattern rotated 60° from boresight, the current and voltage values are: $V_{11}=5$ V; $V_{22}=1.84$ V; $V_{33}=0$ V; $V_{44}=3.16$ V; $I_1=35.35$ mA; $I_2=13$ mA; $I_3=0$ mA; and $I_4=22.35$ mA.

The necessary voltage values are then scaled such that the largest voltage equates to 1 and each of the other voltages equate to the fractional amount which they are in comparison to the largest voltage value. For example, the scaled voltage values for the exemplary antenna are: $V_{11}=1$ V; $V_{22}=0.368$ V; $V_{33}=0$; $V_{44}=0.632$ V; $I_1=7.07$ mA; $I_2=2.60$ mA; $I_3=0$ mA; and $I_4=4.47$ mA.

The scaled voltage values are subsequently utilized to establish the desired amplitude variation provided by the amplitude varying elements with the element connected to the port having a corresponding scaled voltage of 1 having a gain of 1 and the other attenuators having gains equal to the scaled voltage value for their associated port. For example, the four variable attenuators for the exemplary antenna configured to have a reception pattern rotated 60° from boresight would be configured such that the attenuator for port 1 has a setting of 25 dB; the attenuator for port 2 has a setting of 16.3 dB; the attenuator for port 3 has a setting such that no power is passed; and the attenuator for port 4 has a setting of 21.0 dB.

For proper direction finding operation, two distinct reception patterns are selected at two distinct angular displacements from a fixed reference direction, typically referred to as boresight. Preferably, the two distinct angular displacements from boresight are selected to be an equal angular displacement from boresight with one angular displacement being measured clockwise from boresight while the other angular displacement is measured counterclockwise. For the monopole/crossed slot antenna 10 configured to receive signals and amplify the received signals according a first reception pattern, the amplitude varying elements 40 have their gain selected according to the percentages calculated from equation (1) to establish the first reception pattern. The antenna 10 subsequently receives a signal and transmits the received signal through the striplines 24 to the amplitude varying elements 40 which vary the amplitude of the received RF signal in accordance to their gain selected by control lines 44. The output of the amplitude varying elements 40 is combined by the power combiner 42 whose output is in turn transformed by power level detector, such as a receiver, 46 from a raw RF power level to a corresponding DC voltage level for transfer to the analog to digital converter 48 which in turn converts the DC voltage to a digital value. The digital value is stored by the microcontroller 50 which subsequently issues digital control signals for conversion by the digital to analog converter 52 to analog signals representing the gain desired by each of the four amplitude varying elements 40 to configure the reception pattern by the antenna 10 in the second configuration. The values of the digital signals sent by the microcontroller 50 via the control lines 44 to the amplitude varying elements 40 is determined once again in accordance to equation (1) in which by selecting the gain of the four elements 40 the reception pattern of the antenna 10 may be steered to a second reception pattern as previously discussed. The antenna 10 subsequently receives a second external signal whose amplitude is varied by the amplitude varying elements 40 in accordance to the gains selected to achieve a second reception pattern. The elements' output is then combined by the power combiner 42, transformed by the power level detector 46 and converted to a digital signal for storage in the microcontroller 50 by the analog to digital converter 48. The microcontroller 50 subsequently determines the difference in amplitude between the two signals received by the monopole/crossed slot antenna 10 in its two configurations. The difference in amplitude is then compared to the values from a calibration curve. The equations determining the curve being digitally encoded in the microcontroller, which relate amplitude differences to angular variations from the reference direction. In this fashion, the direction of the received signal 15 may be determined by utilizing a single monopole/crossed slot antenna 10 which is sequentially configured to receive signals based upon two distinct reception patterns.

The process described herein in which the monopole/cross slot antenna 10 is configured for a first reception pattern and subsequently for a second reception pattern is repeated continuously in which the reception pattern is altered between a first and a second reception pattern by means of the control lines 44, driven by the microcontroller 50, to the amplitude varying element 40. The rate at which the antenna 10 is reconfigured between the first and second reception patterns is determined by the rate at which the microcontroller 50 is programmed to alter the amplitude varying elements' control lines 44 serving to configure the antenna 10. The rate at which the antenna 10 is reconfigured is desirably rapid enough that the antenna 10 is receiving essentially the same wavefront in both its first and second configurations. While in this embodiment it is impossible to configure the antenna 10 for both patterns simultaneously, it has been found that switching between the two alternative reception patterns had a rate of approximately 10 milliseconds is sufficiently rapid to receive reliable data from the antenna 10 over a broad frequency bandwidth.

Figure 5:
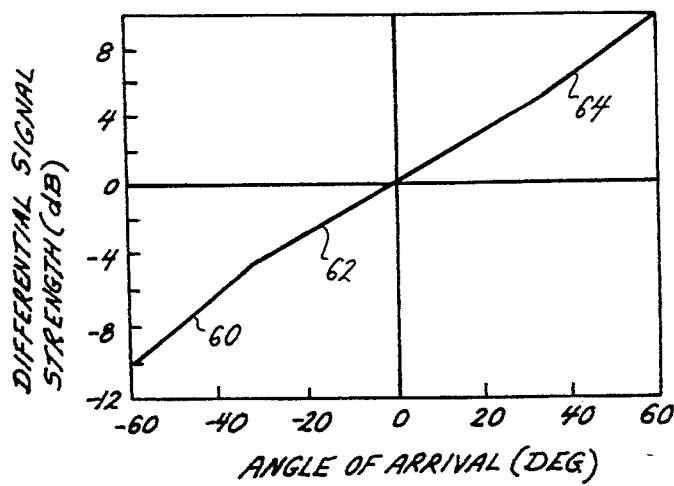
FIG. 5 is a graph of the angle of arrival of the received signals in relation to the difference in the two signals received by the antenna.

The calibration curve digitally encoded within the microcontroller 50 is comparable to the two dimensional graph shown in FIG. 5, in which a comparison is made of the relationship of amplitude difference with angular displacement from boresight for two distinct reception patterns each located 60° clockwise and counterclockwise, respectively from boresight whose gains are shown in FIG. 6. The graph shown in FIG. 5 has been experimentally determined and is comprised of three distinct linear segments. A first segment 60 extends from −60° to −30° and has a slope of 5.30°/dB. A second segment 62 extends between −30° and +30° with a slope of 6.49/dB while a third segment 64 extends from +30° to +60° with a slope of 5.63°/dB. Additionally, the frequency at which the graph was compiled was 120 MHZ. Similar graphs and subsequently generated calibration curves may be compiled for any other desired angular displacements from boresight, however, the ±60° angular displacement was selected so that there would be a sufficient amplitude difference between the two reception patterns for signals received having a small angular displacement from boresight. The direction finding system, however, may be optimized for other angular displacements for the reception pattern by merely selecting alternate gain values for the amplitude varying elements 40 pursuant to equation (1) and thus reconfiguring the two reception patterns defining the behavior of the antenna 10. Additional calibration curves may be generated for reception of signals having frequencies other than 120 MHz. The equations defining a family of such calibration curves may be digitally encoded in the microcontroller and based upon the frequency of the signals received by the antenna, as determined by a device such as a frequency determining receiver, the appropriate calibration curve may be selected and utilized by the microcontroller to determine the received signals' angle of arrival. Should the frequency of the received signals be between the frequencies of the calibration curves digitally encoded in the microcontroller, an interpolation routine may be employed to interpolate between the nearest, higher frequency calibration curves and the nearest, lowest frequency calibration curve to the received frequency.

Additional electrical components may be introduced in a second embodiment of the direction finding system in order to simultaneously configure the antenna 10 in both selected reception patterns. A schematic of the electrical circuitry is shown is FIG. 7 and comprises a monopole/crossed slot antenna 10 as previously described. The four ports of the antenna 10 are connected to power dividers 39 which split the RF signals received from the antenna 10 pass approximately half of the signal to each of two sets of amplitude varying means 40.

The amplitude varying means 40 operate as previously described and vary the amplitude of the received signals according to preset amounts selected by control lines 44. The outputs of the two sets of amplitude varying means 40 are combined by a pair of power combiners 42 whose outputs are in turn transformed to corresponding DC voltage levels by a pair of power level detectors 46 as previously described. The DC voltage levels from the power level detectors 46 are converted to digital signals by a pair of analog-to-digital converters 48. The digitized signals are simultaneously presented to the microcontroller 50 via two input ports. The microcontroller 50 may thus compare the values of the two signals and by references to the appropriate calibration curve, as previously described, may determine the angle of arrival of the signal received by the antenna 10.

In this second embodiment, the antenna is configured to have two distinct reception patterns simultaneously due to the two sets of amplitude varying elements 40 which may each be configured to vary the amplitude of the received signals in different amounts. Thus, the first set of amplitude varying elements 40a may have their amplitude variance selected to receive the signals in a first reception pattern while the second set of amplitude varying elements 40b may have their amplitude variance selected to receive the signals in a second reception pattern.

The amplitude varying elements may still have the amount of their amplitude variance altered by means of control lines 44 extending from the microcontroller 50 through a pair of digital-to-analog converter 52. With such a simultaneous reception system, however, there is no need to alternate the configuration of the amplitude varying elements between a first and a second reception pattern as both of such patterns are configured simultaneously by the two sets of amplitude varying elements 40.

The direction finding system hereinbefore described may be utilized by itself or may be combined with an existing phase-based system for more accurate angular determinations. In particular, a dual antenna phase-based approach employing a pair of monopole/crossed slot antennas could be utilized as is well known to those skilled in the art. The spacing between the two antennas, however, may be substantially greater than $\lambda/2$ when used in conjunction with the direction finding system on this invention. For example, spacing of $2\lambda$ may be allowed between the two antennas. Upon receipt of a signal, the dual antenna phase-based system determines the phase difference between the signals received by the first and second antennas. This determination is typically quite accurate and angles of arrival may be determined within ±0.5°. For spacings larger the $\lambda/2$, such as $2\lambda$, however, it is impossible to determine which wavefronts the phase difference was actually measured between, as the spacing of the antennas is large enough that several wavefronts may be measured by the nearest antenna to the emitter prior to the measurement of the first wavefront by the furthest antenna. Thus, based upon the phase difference measured, a number of potential angles of arrival may be determined based upon the phase difference measured only one of which is actually correct. In use with the direction finding system of this invention, the electrical connections to a first antenna are reconfigured following the measurements in the dual antenna phase-based mode such that it operates as the monopole/crossed slot antenna 10 described previously in conjunction with the direction finding system of this invention. This single reconfigured antenna 10 thereafter sequentially receives signals while configured in two alternating reception patterns so as to determine the angle of arrival of the signal to within approximately ±2°. Based upon this determination, it is possible to determine which of the several angles of arrival determined to within approximately ±0.5° by the phase-based system is the true angle of arrival and which are "ghost" signals due to the large spacing of the dual antennas. By allowing for larger space between the antennas, increased flexibility with respect to the dual antenna phase-based approach is provided the designer who may be working under space and location restraints upon the platform on which the antennas are to be mounted while increased accuracy is provided in comparison to the use of a single monopole/crossed slot antenna alone.

Although there has been illustrated and described in specific detail and structure of operations, it is clearly understood that the same were merely for purposes of illustration and that changes and modifications may be readily made therein by those skilled in the art without departing from the spirit and scope of the invention.

What is claimed is:

1. A direction finding system, comprising:
   a monopole/crossed slot antenna for receiving signals;
   antenna configuring means for simultaneously configuring said monopole/crossed slot antenna according to both a first and a second predetermined reception pattern such that a signal received by said monopole/crossed slot antenna is transformed to both a first subsignal by said monopole/crossed slot antenna configured according to the first predetermined reception pattern and to a second subsignal by said monopole/crossed slot antenna configured according to the second reception pattern;
   means, responsive to said antenna configuring means, for determining a difference in amplitude between the first and second subsignals; and
   conversion means for converting the amplitude difference determined by said amplitude difference determining means between the first and second subsignals to an angular value corresponding to an angular difference between an angle at which the signals were received by said monopole/crossed slot antenna and a predetermined reference direction.

2. A direction finding system according to claim 1 wherein said monopole/crossed slot antenna comprises:
   a first ground plane of conductive material defining first and second intersecting slots therein;
   a second ground plane of conductive material positioned substantially parallel to said first ground plane;
   a first stripline of a conductive material located between and substantially parallel to said first and second ground planes;
   a second stripline of a conductive material located between and substantially parallel to said first and second ground planes, said second stripline being positioned substantially perpendicular to said first stripline and intersecting said first stripline at a center thereof; and
   a monopole connected at the intersection of said first and second striplines and extending through the intersection of the first and second slots defined within said first ground plane.

3. A direction finding system according to claim 2 wherein said first and second striplines each include first and second terminal ends, and wherein said antenna configuring means comprises a plurality of amplitude varying elements connected to the first and second terminal ends of said first and second striplines.

4. A direction finding system according to claim 3 wherein said antenna configuring means further comprises:
   a microcontroller for generating a predetermined set of signals corresponding to a predetermined reception pattern of said monopole/crossed slot antenna; and
   means for transmitting the set of signals to said plurality of amplitude varying elements, the set of signals determining the amplitude variation supplied by each amplitude varying element, thereby configuring said monopole/crossed slot antenna according to the predetermined reception pattern.

5. A direction finding system according to claim 4 wherein said plurality of amplitude varying elements comprises a plurality of first amplitude varying elements and a plurality of second amplitude varying elements, at least one of said first amplitude varying elements and at least one of said second amplitude varying elements connected to each terminal end of both said first and second striplines, wherein said microcontroller generates first and second predetermined sets of signals corresponding to the first and second predetermined reception patterns of said monopole/crossed slot antenna, and wherein said transmitting means transmits the first set of signals to the first, amplitude varying elements and the second set of signals to the second antenna varying elements such that said monopole/crossed slot antenna is simultaneously configured according to both the first and second reception patterns.

6. A direction finding system according to claim 5 further Comprising means for scaling the signals received by said monopole/crossed slot antenna, the scaling means comprising:
   a power combiner for combining the output of each of said first amplitude varying elements and for combining the output of each of said second amplitude varying elements;
   power level detecting means for translating the combined outputs of said first and second amplitude varying elements to corresponding first and second DC voltage levels; and
   an analog to digital convertor for converting the first and second DC voltage levels to corresponding first and second digital values prior to determining the difference therebetween.

7. A direction finding system according to claim 4 wherein the first and second sets of signals generated by said microcontroller are selected such that the first and second reception patterns of said monopole/crossed slot antenna are shaped substantially identically and are rotated equal angular amounts in opposite directions from a predetermined reference direction.

8. A direction finding system according to claim 3 wherein said plurality of amplitude varying elements are selected from the group consisting of variable gain amplifiers and variable attenuators.

9. A direction finding system according to claim 2 wherein said monopole/crossed slot antenna further comprises:
   a plurality of conductive posts connecting said first and second ground planes, said plurality of posts being positioned about a periphery of said first and second ground planes to define a cavity between said first and second ground planes;
   a layer of dielectric material filling said cavity; and
   a plurality of ports, each port electrically connected to a terminal end of said first and second stripline.

10. An apparatus for determining an angle of arrival of a signal, the apparatus comprising:
    a monopole/crossed slot antenna for receiving the signal, said antenna comprising:
      a first ground plane of conductive material defining first and second intersecting slots therein;
      a second ground plane of conductive material positioned substantially parallel to said first ground plane;

a first stripline of a conductive material located between and substantially parallel to said first and second ground planes;

a second stripline of a conductive material located between and substantially parallel to said first and second ground planes, said second stripline being positioned substantially perpendicular to said first stripline and intersecting said first stripline at a center thereof; and a monopole connected at the intersection of said first and second striplines and extending through the intersection of the first and second slots defined within said first ground plane;

antenna configuring means for simultaneously configuring said monopole/crossed slot antenna according to both a first and a second predetermined reception pattern such that a signal received by said monopole/crossed slot antenna is transformed to both a first subsignal by said monopole/crossed slot antenna configured according to the first predetermined reception pattern and to a second subsignal by said monopole/crossed slot antenna configured according to the second reception pattern;

means, responsive to said antenna configuring means, for determining a difference in amplitude between the first and second subsignals; and conversion means for converting the amplitude difference determined by said amplitude difference determining means between the first and second subsignals to an angular value corresponding to an angular difference between an angle at which the signals were received by said monopole/crossed slot antenna and a predetermined reference direction.

11. An apparatus for determining an angle of arrival of a signal according to claim 10 wherein said first and second striplines each include first and second terminal ends, and wherein said antenna configuring means comprises a plurality of amplitude varying elements connected to the first and second terminal ends of said first and second striplines.

12. An apparatus for determining an angle of arrival of a signal according to claim 11 wherein said antenna configuring means further comprises:

a microcontroller for generating a predetermined set of signals corresponding to a predetermined reception pattern of said monopole/crossed slot antenna; and means for transmitting the set of signals to said plurality of amplitude varying elements, the set of signals determining the amplitude variation supplied by each amplitude varying element, thereby configuring said monopole/crossed slot antenna according to the predetermined reception pattern.

13. An apparatus for determining an angle of arrival of a signal according to claim 12 wherein said plurality of amplitude varying elements comprises a plurality of first amplitude varying elements and a plurality of second amplitude varying elements, at least one of said first amplitude varying elements and at least one of said second amplitude varying elements connected to each terminal end of both said first and second striplines, wherein said microcontroller generates first and second predetermined sets of signals corresponding to the first and second predetermined reception patterns of said monopole/crossed slot antenna, and wherein said transmitting means transmits the first set of signals to the first amplitude varying elements and the second set of signals to the second antenna varying elements such that said monopole/crossed slot antenna is simultaneously configured according to both the first and second reception patterns.

14. An apparatus for determining an angle of arrival of a signal according to claim 13 further comprising means for scaling the signals received by said monopole/crossed slot antenna, the scaling means comprising:

a power combiner for combining the outputs of each of said first amplitude varying elements and for combining the outputs of each of said second amplitude varying elements;

power level detecting means for translating the combined outputs of said first and second amplitude varying elements to corresponding first and second DC voltage levels; and an analog to digital convertor for converting the first and second DC voltage levels to corresponding first and second digital values prior to determining the difference therebetween.

15. An apparatus for determining an angle of arrival of a signal according to claims 12 wherein the first and second sets of signals generated by said microcontroller are selected such that the first and second reception patterns of said monopole/crossed slot antenna are shaped substantially identically and are rotated equal angular amounts in opposite directions from a predetermined reference direction.

16. A method for determining an angle of arrival of a signal with a monopole/crossed slot antenna, the method comprising the steps of:

simultaneously configuring the monopole/crossed slot antenna according to both first and second predetermined reception patterns;

receiving the signal with the monopole/crossed slot antenna simultaneously configured according to both the first and second predetermined reception patterns;

transforming the same received signal according to both the first and second reception patterns into first and second transformed subsignals, respectively;

determining a difference in amplitude between the first and second transformed subsignals; and converting the amplitude difference between the first and second transferred subsignals into the angle of arrival of the received signal from a predetermined reference direction.

17. A method for determining an angle of arrival of a signal according to claim 16 further comprising the step of splitting the received signal into first and second subsignals prior to transforming the first and second subsignals.

18. A method for determining an angle of arrival of a signal according to claim 11 wherein the first and second predetermined reception patterns are shaped substantially identically and are rotated equal angular amounts in opposite directions from the predetermined reference direction.

19. A method for determining an angle of arrival of a signal according to claim 16 wherein the monopole/crossed slot antenna comprises:

a first ground plane of conductive material defining first and second intersecting slots therein;

a second ground plane of conductive material positioned substantially parallel to said first ground plane;

a first stripline of a conductive material located between and substantially parallel to said first and second ground planes;

a second stripline of a conductive material located between and substantially parallel to said first and second ground planes, said second stripline being positioned substantially perpendicular to said first stripline and intersecting said first stripline at a center thereof; and a monopole connected at the intersection of said first and second striplines and extending through the intersection of the first and second slots defined within said first ground plane; and wherein at least one first amplitude varying element and at least one second amplitude varying element are connected to each terminal end of both the first and second striplines, and wherein said step of simultaneously configuring the antenna according to first and second predetermined reception patterns comprises the steps of:

generating first and second predetermined sets of signals corresponding to the first and second predetermined reception patterns of the monopole/crossed slot antenna; and transmitting the first set of signals to the first amplitude varying elements and the second set of signals to the second antenna varying elements such that said monopole/crossed slot antenna is simultaneously configured according to both the first and second reception patterns.

20. A method for determining an angle of arrival of a signal according to claim 19 further comprising the step of:

scaling the signals received by the monopole/crossed slot antenna, said scaling step comprising the steps of:

combining the outputs of each of the first amplitude varying elements and for combining the outputs of each of the second amplitude varying elements;

translating the combined outputs of the first and second amplitude varying elements to corresponding first and second DC voltage levels; and converting the first and second DC voltage levels to corresponding first and second digital values prior to said amplitude difference determining step.

* * * * *